(12) United States Patent
Gray et al.

(10) Patent No.: US 8,674,613 B2
(45) Date of Patent: Mar. 18, 2014

(54) POWER REFORMING METHODS AND ASSOCIATED MULTIPHASE LIGHTS

(75) Inventors: Richard Landry Gray, Saratoga, CA (US); Po Ming Tsai, Taipei (TW)

(73) Assignee: Richard Landry Gray, Saratoga, CA (US)

( * ) Notice: Subject to any disclaimer, the term of this patent is extended or adjusted under 35 U.S.C. 154(b) by 678 days.

(21) Appl. No.: 12/820,131

(22) Filed: Jun. 21, 2010

(65) Prior Publication Data
US 2010/0320927 A1      Dec. 23, 2010

Related U.S. Application Data

(63) Continuation-in-part of application No. 12/770,727, filed on Apr. 30, 2010.

(60) Provisional application No. 61/236,757, filed on Aug. 25, 2009, provisional application No. 61/220,582, filed on Jun. 26, 2009, provisional application No. 61/219,337, filed on Jun. 22, 2009.

(51) Int. Cl.
*H05B 37/00*       (2006.01)

(52) U.S. Cl.
USPC .................. 315/209 R; 315/297; 315/200 R; 315/312

(58) Field of Classification Search
USPC ......... 315/119, 125, 127, 128, 177, 186, 193, 315/200 R, 206, 209 R, 219, 224, 225, 276, 315/283, 287, 291, 297, 299, 306, 307, 360, 315/362
See application file for complete search history.

(56) References Cited

U.S. PATENT DOCUMENTS

| | | | |
|---|---|---|---|
| 7,365,499 B2 * | 4/2008 | Nerone et al. | 315/247 |
| 2011/0133655 A1 * | 6/2011 | Recker et al. | 315/159 |

* cited by examiner

*Primary Examiner* — Douglas W Owens
*Assistant Examiner* — Jianzi Chen (57) ABSTRACT

The present invention relates to power reforming methods and associated multiphase lights, especially to power reforming methods and associated multiple lights that selectively turn ON and OFF to reform current to follow voltage appropriately, which provides better heat dissipation, improving power factor and color mixing capability. The method comprises acts of rectifying an AC voltage to a pulsating DC voltage, synchronizing an internal time base signal to the pulsating DC voltage, setting pulse duration in a pulse period and turning ON and OFF of an electronic device. The device comprises at least two loads, a rectifier, at least two drivers and a controller.

6 Claims, 10 Drawing Sheets

POWER REFORMING METHODS AND ASSOCIATED MULTIPHASE LIGHTS

CROSS REFERENCE TO RELATED APPLICATIONS

This application claims priority and is filed as Continuation in Part (CIP) to U.S. patent application Ser. No. 12/770,727 filed on Apr. 30, 2010 and claims priority to U.S. provisional patent applications No. 61/219,337 filed on Jun. 22, 2009, 61/220,582 filed on Jun. 26, 2009, and 61/236,757 filed Aug. 25, 2009, which applications are hereby incorporated by this reference in their entireties.

FIELD OF THE INVENTION

The present invention relates to power reforming methods and associated multiphase lights, especially to power reforming methods and associated multiple lights that selectively turn ON and OFF to reform current to follow an input voltage more appropriately, which provides better heat dissipation, improving power factor and color mixing capability.

BACKGROUND OF THE INVENTION

The optimal situation for power transfer to a load connected to a line voltage (i.e. a 60 Hz alternating current (AC) power source used in a house) occurs when the load looks like a resistor to the line voltage. The power factor (PF) is a measure of how much the load looks like an ideal resistor. The power factor is defined as the ratio of the real power flowing to the load compared to the apparent power. Power factor values can range from 0 to 1 where a power factor equal to 0 would be the worst case and a power factor equal to 1 would be the best case. Power factor decreases from a value of 1 when the load has a reactive component or when the load is nonlinear.

Most ballasted lighting technologies such as white light emitting diode (WLED), organic light emitting diode (OLED), compact fluorescent lamp (CFL) and cold cathode fluorescent lamp (CCFL) do not present a linear resistive load to the incoming line voltage. Significant power losses can occur from the source of the power to where the power is ultimately consumed, at the load.

Therefore, the modern light (as well as other electronic appliances like battery chargers) are, or will very soon be, required to have power factor over 0.7~0.9 in order to achieve better power efficiency. Despite higher initial costs, lighting solutions that provide more light output for less power (lumens per watt) are becoming economically viable due to their energy savings and long life.

Light emitting diodes (LEDs), as well as white LED (WLED), recently have become an indispensable light source due to their small size, fast lighting response, energy efficiency and long life expectancy. However, the LED still has some drawbacks that are caused by their inability to efficiently shed their waste heat. WLED lifetime decreases at an exponential rate as operating temperature increases.

In addition to the efficiency gains of modern light sources, some people use color mixing or dimming techniques (i.e. pulse width modulation (PWM) techniques) to produce a desired color. By turning different colored lamps, in close proximity, ON and OFF for various periods of time the resultant light color, as perceived by humans, can be adjusted by changing the amount of time that one lamp is on compared to another lamp. In order to avoid visible flickering the rate at which the lamps are turned ON and OFF must be above a human's ability to perceive. If there are multiple lamps in the same room and the lamps use PWM techniques to provide a mixing/dimming function then the lamps must have the same mixing/dimming frequency. If they have different dimming frequencies, the multiple lamps used in the room may appear to flicker due to the "beating" phenomenon.

Beating occurs when signals of two different frequencies are mixed together. The signal mixing process causes two other frequencies to become apparent: the sum of the two initial frequencies and the difference of the two initial frequencies. For lighting applications the difference frequency causes the most problems because, if the initial signal frequencies only vary by a few cycles per second, then the difference frequency is well within a human's ability to perceive it. This "beating" problem, no matter what type of light is used, happens very often when the dimming frequencies of different lamps are not synchronized in some way. Normal variations in electronic processing make it extremely difficult to match the frequencies of two independent groups of electronics without using very accurate, expensive techniques.

SUMMARY OF THE INVENTION

The present invention has several objectives, which generally relate to a power reforming method and associated multiphase lights that selectively turn ON and OFF to reform current that provides better power factor, heat dissipation and color mixing.

One objective of the present invention is to provide a power reforming method for an electronic device that, turning ON and OFF of at least two loads of the electronic device, reforms a current waveform by overlapping the individual load current waveforms so that their sum more appropriately follows a voltage waveform, thus improving the power factor of the electronic device.

Another objective of the present invention is to provide a power reforming method with better heat dissipation, which is achieved by turning at least two lamps of the electronic device OFF respectively to reduce the ON time of each lamp and effectively spread the lamp's heat.

Another objective of the present invention is to provide a power reforming method for a color mixing device that, selectively turning at least two different color lamps ON for a specific interval, forms a desired color.

The power reforming method for an electronic device in accordance with the present invention comprises acts of rectifying an alternating current (AC) voltage to a pulsating direct current (DC) voltage, synchronizing an internal time base signal to the pulsating DC voltage, setting pulse durations in a pulse period of the pulsating DC voltage, and turning ON and OFF of an electronic device according to those pulse durations. Appropriately timing the ON and OFF portions of the electronic device shapes the current to more accurately follow the pulsating direct current (DC) voltage. The change of relative phase (timing) between current and voltage can be reduced thus increasing the power factor.

Alternatively, the acts of setting pulse durations in a pulse period and turning ON and OFF of the electronic device can be applied to a light device, which may turn at least two lamps of the light device ON and OFF respectively. Each lamp is only turned ON for a period of time, the lamps are interleaved with each other. Yet because of the addition of interleaved lamps there is no decrease in overall light output. The power and heat dissipation of each individual lamp is decreased by the ratio of the individual lamp's OFF time to the total time in one period.

Alternatively, the acts of setting pulse durations in a pulse period and turning ON and OFF of an electronic device can be applied to a color mixing device, which may turn at least two different colored lamps of the color mixing device ON and OFF for a predetermined interval respectively.

The power reforming method for a color mixing device synchronizes the ON and OFF periods of the different color lamps to the pulsating DC voltage. Thus, the frequencies of different color lamps are all matched to the frequency of the pulsating DC voltage, which avoids flicker during color mixing. Since the frequency of the color mixing device is synchronized to the pulsating DC voltage that necessarily means that every color mixing device on the same AC power line is synchronized to every other color mixing device.

One objective of the present invention is to provide a multiphase light with better power factor by reshaping the current waveform to achieve better relative phase between current and voltage.

Another objective of the present invention is to provide a multiphase light with better heat dissipation.

Another objective of the present invention is to provide a multiphase light with color mixing capability.

The multiphase light in accordance with the present invention comprises at least two lamps, a rectifier, at least two drivers and a controller.

The lamp may be a cold cathode fluorescent lamp (CCFL), an external electrode fluorescent lamp (EEFL), a carbon nanotube lamp (CNL), a light emitting diode (LED) lamp or an organic light emitting diode (OLED) lamp.

The rectifier is connected to an external AC power source (i.e. a line voltage used in a residence), and rectifies an AC voltage to a pulsating DC voltage.

Each driver drives the corresponding lamp which, in turn, provides current to each of the lamps.

The controller is connected between the rectifier and the driver, and generates a pulse-width modulation (PWM) signal synchronized to the pulsating DC voltage, which turns the driver ON and OFF at least one interval for each period of the pulsating DC voltage.

The controller may turn the drivers all OFF near or at 0 and 180 degrees, turn the drivers all ON near or at 90 and 270 degrees and turn the at least one driver ON at other angular positions during a period of pulsating DC voltage, which shapes current to more accurately follow the waveform of the pulsating DC voltage thus improving the power factor.

The controller may turn the drivers ON and OFF sequentially to lower the power and heat dissipation of each individual lamp by the ratio of the lamp OFF time to the total time of the period.

The controller may turn the drivers ON and OFF for a predetermined interval respectively for color mixing. Each lamp may have different color or color temperature. Varying the duty cycle of the each lamp achieves a desired color for color mixing.

Preferably, the at least two lamp may be CCFLs or WLEDs in the form of an interleaved helical shape and be mounted on a base. The base may be an Edison base connector. Moreover, the rectifier, the at least two driver and the controller may be integrated into an electronic module that is located in the base.

DETAILED DESCRIPTION OF THE PRESENT INVENTION

Figure 1:
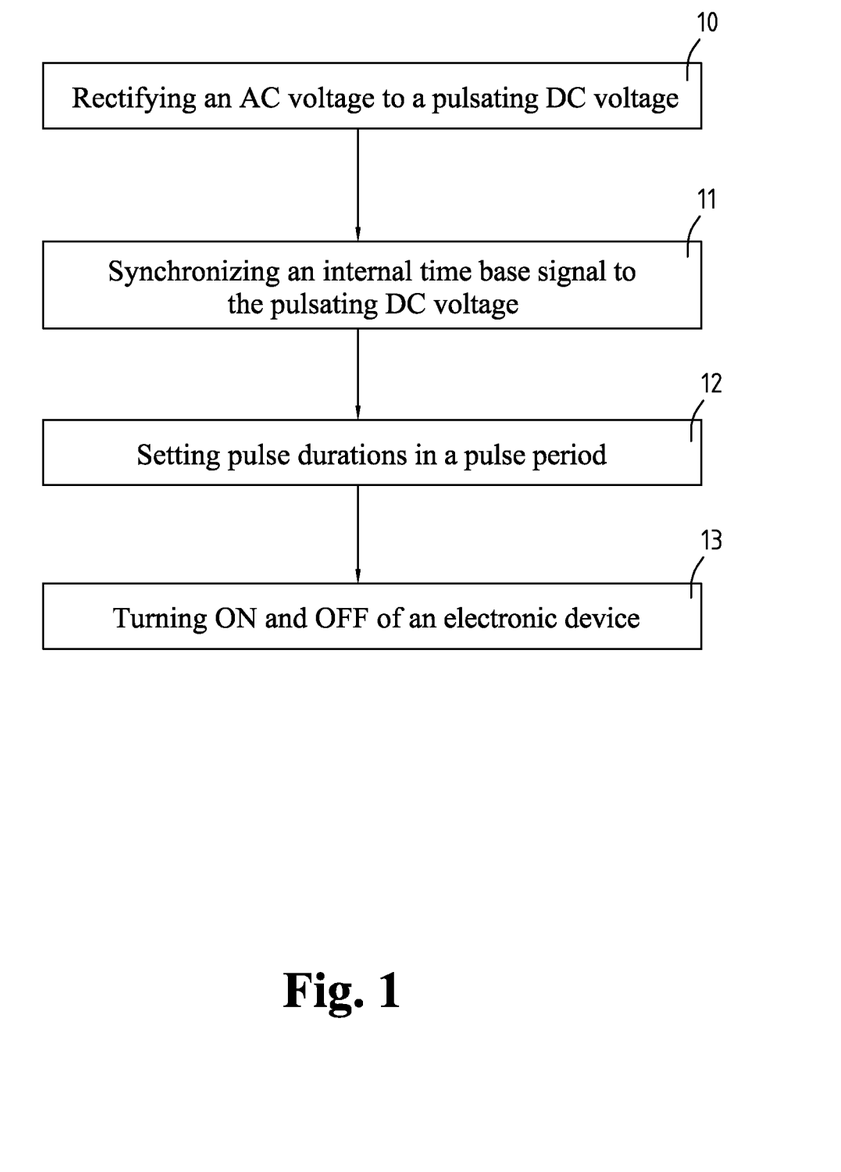
FIG. 1 is a flow diagram of a power reforming method in accordance with the present invention.

With reference to FIG. 1, a power reforming method for an electronic device in accordance with the present invention comprises acts of rectifying an alternating current (AC) voltage to a pulsating direct current (DC) voltage (10), synchronizing an internal time base signal to the pulsating DC voltage (11), setting pulse durations in a pulse period (12) and turning ON and OFF of an electronic device (13).

The act of rectifying an AC voltage to a pulsating DC voltage (10) rectifies an AC voltage to a pulsating DC voltage. The frequency of the AC voltage is often 60 Hz for many commercial and residential applications.

The act of synchronizing the pulsating DC voltage (11) synchronizes the phase of an internal time base signal to the pulsating DC voltage.

The act of setting pulse durations in a pulse period (12) sets at least one rising time and at least one falling time of at least two control signals corresponding to the internal time base signal.

The internal time base signal is synchronized to the pulsating DC voltage. The frequency of the internal time base signal may be some multiple higher than the frequency of the pulsating DC voltage and still remain phase locked to the pulsating DC voltage. The at least one rising time and at least one falling time of the at least two control signals can easily be determined by a mathematical calculation using the internal time base signal. For example, if the frequency of the internal time base signal is 480 Hz we can easily divide the pulsating DC voltage into 8 parts by using three 2-dividers ($2^3=8$). The timing of each part is 1 period of the internal time base signal and is about 2.08 ms (mili-second) (i.e. ($1/60$ Hz)/8=2.08 ms).

Preferably, the frequencies of the internal time base signals are at least 2 times higher (i.e. 120 Hz) than the frequency of the AC voltage.

The act of turning ON and OFF of the electronic device (13) turns at least two loads of the electronic device ON and OFF for at least one interval corresponding to the control signal, which shapes the current to more accurately follow the waveform of the pulsating DC voltage. The interval has an ON time portion and an OFF time portion. The OFF time portion may be selected from a group consisting of 10% to 90% of duty cycle and the ON and OFF times portions can be symmetrically or non-symmetrically distributed in a period of the pulsating DC voltage.

Preferably, turning the loads all OFF near or at 0 and 180 degrees, turning the loads all ON near or at 90 and 270 degrees and turning the at least one load ON near other angular positions of a period of pulsating DC voltage, which shapes current by overlapping current waveforms in order that the current will more accurately follow the waveform of the pulsating DC voltage, thus improving the power factor.

When the at least two loads of the electronic device are either all OFF, at least one OFF, at least one ON or all ON, overlapping current waveforms of the loads approximately follow the waveform of the pulsating DC voltage. In other words, the change of relative phase (timing) between current and voltage can be reduced thus increasing the power factor.

The load may be a cold cathode fluorescent lamp (CCFL), an external electrode fluorescent lamp (EEFL), a carbon nanotube lamp (CNL), a light emitting diode (LED) lamp or an organic light emitting diode (OLED) lamp.

Figure 2A:
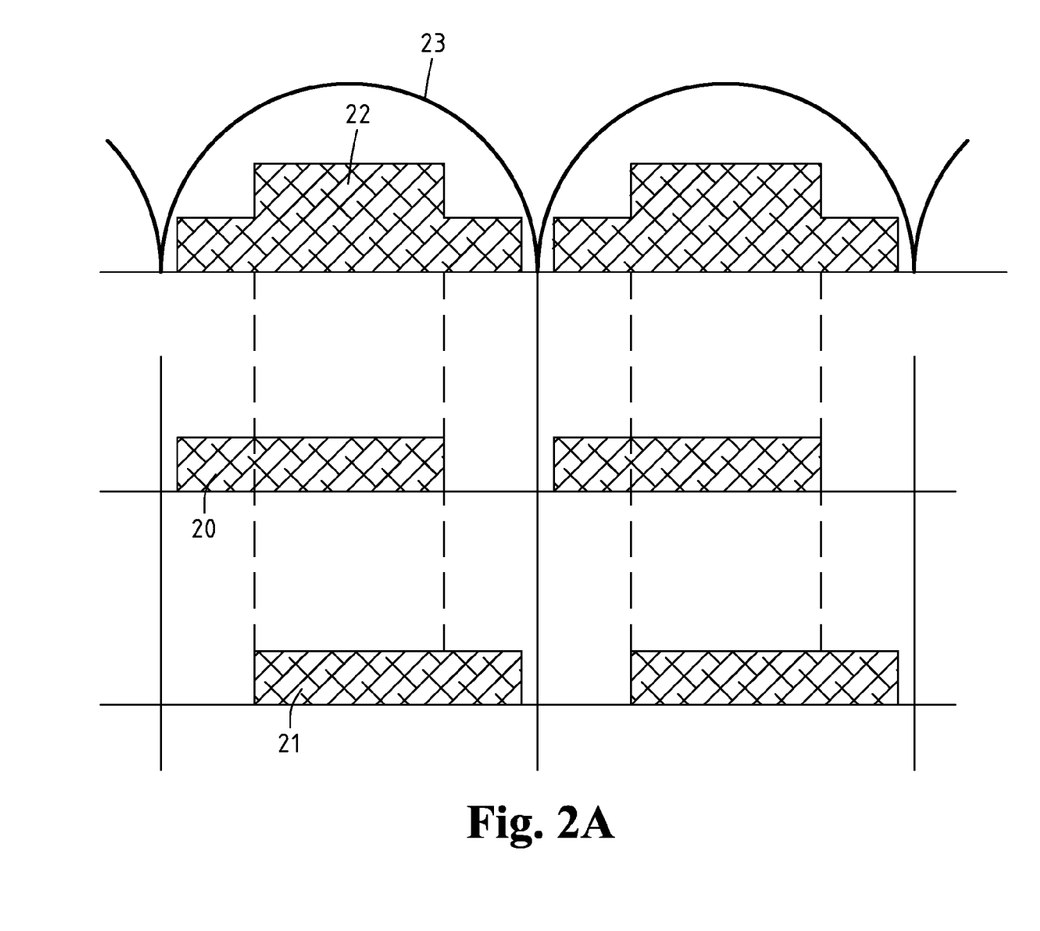
FIG. 2A is a waveform diagram illustrating an embodiment using the power reforming method of the present invention.
Figure 2B:
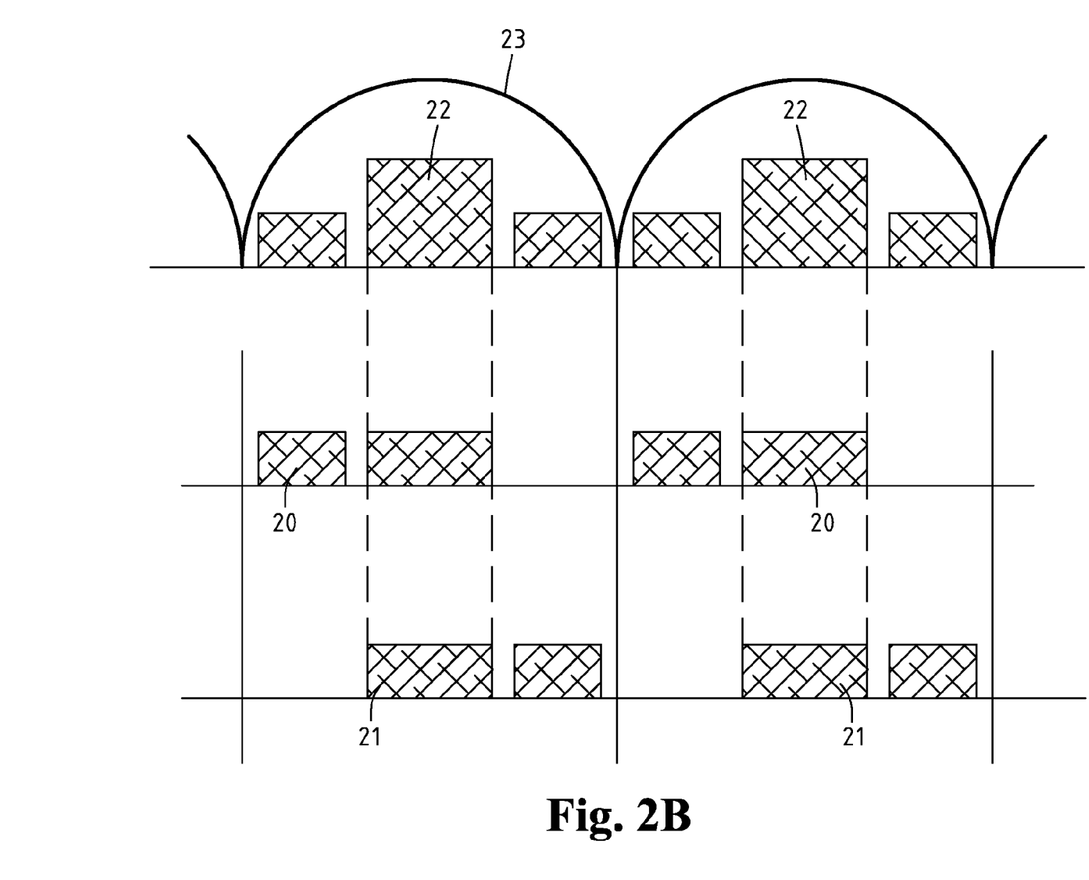
FIG. 2B is a waveform diagram illustrating another embodiment using the power reforming method of the present invention.

With reference to FIGS. 2A and 2B, which show embodiments when current waveforms (20, 21) of two loads have been overlapped to achieve better power factor. An overlapped current (22) ramps up in steps from 0 degree to 90 degree and down from 90 degree to 180 degree, which more closely follows a waveform of the pulsating DC voltage (23) than would a single lamp. The embodiment in FIG. 2B shows higher frequency than the embodiment in FIG. 2A.

Figure 3:
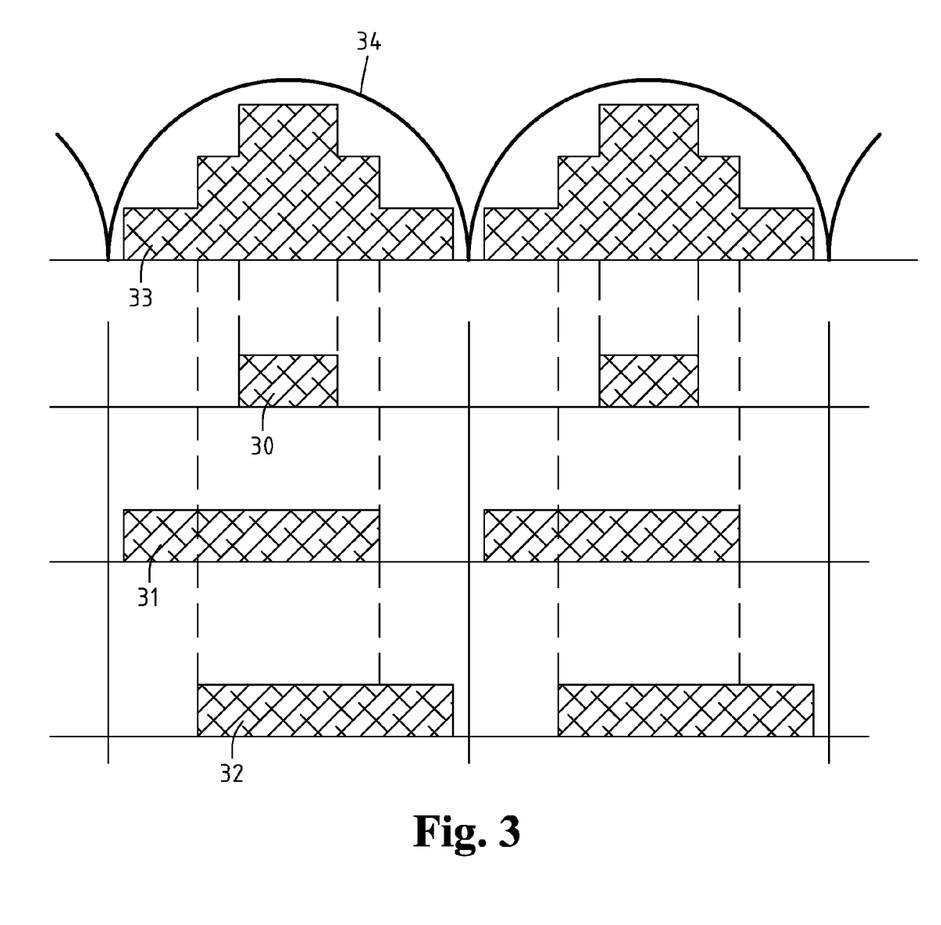
FIG. 3 is a waveform diagram illustrating another embodiment using the power reforming method of the present invention.

With reference to FIG. 3, which shows another embodiment when current waveforms of three loads (30, 31, 32) have been overlapped to form a waveform (33) corresponding to a waveform of a pulsating DC voltage (34) that achieves better power factor.

Figure 4:
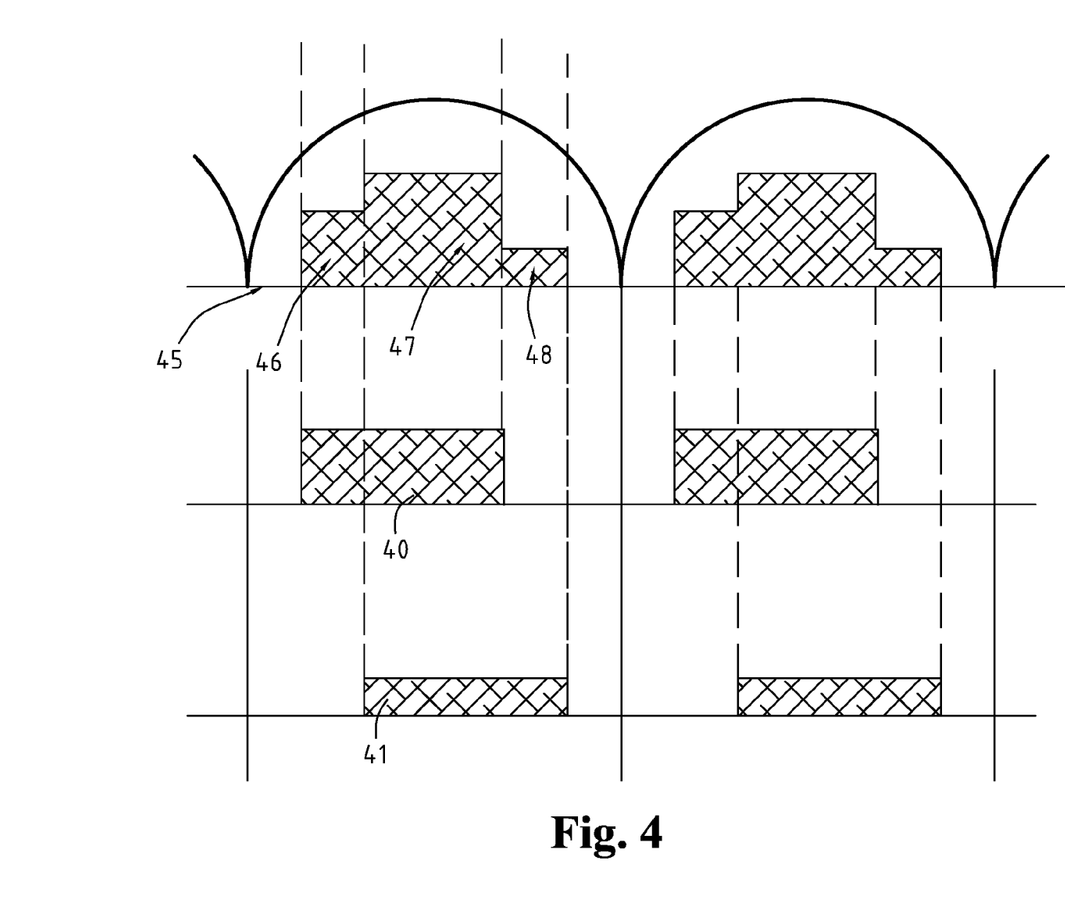
FIG. 4 is a waveform diagram illustrating another embodiment using the power reforming method of the present invention.

With further reference to FIG. 4, which shows another embodiment when one of the loads runs at a different power level different from that of the other load (perhaps driven by a different voltage supply or different current setting). For example, if one load (40) provides 2 times or half the power of the other load (41), the overlapping of the current waveforms can achieve 4 different power levels. The power levels comprises zero (45), low power ON (48), middle power ON (46) and high power ON (47). The power factor is improved significantly in this situation too.

With reference to FIG. 1, alternatively, the power reforming method in accordance with the present invention can be applied to a light device, which may turn at least two lamps of the light device ON and OFF respectively. Each lamp is only turned ON for a period of time. The lamps' ON and OFF times are interleaved with each other. Optimally the lamps would be physically interleaved as well. Yet because of the addition of the interleaved lamps there is no decrease of overall light output. The power and heat dissipation of each individual load is decreased by the ratio of the lamp OFF time to the total time of one period.

Turning OFF all lamps for short periods of time will decrease the light output. The longer the OFF time portion is, the less light will be output. Persons skilled in the art will realize that less light is produced when the OFF times are increased and the ON times get progressively shorter and shorter. This technique is sometimes known as a pulse-width modulation (PWM) dimming technology.

For example, two white light emitting diode (WLED) strings of an electronic device that have each been turned ON for 50% of the time will in total still produce the same light output as a single string of WLEDs that was turned on 100% of the time. What is even more interesting is that the total light output of the two strings running at 50% duty cycles may actually be MORE than that of the single string running at 100% because the temperature of the LEDs could conceivably be cooler in the multiphase case.

During the time that the WLED strings are OFF, residual heat will flow away into a heat sink on which the WLEDs have been mounted. When one WLED string is ON, it can still be run at its optimum power for highest light efficiency. Thus, doubling the number of strings without doubling the power increases the amount of heat transfer area from the string to the heat sink which lowers the WLED operating temperature.

However, the two WLED strings of a dual string WLED lighting device, as mentioned in previous paragraphs, would increase the manufacturing cost by doubling the cost of the WLEDs. Since the WLED lifetime increases at an exponential rate due to the operating temperature decrease, the present invention would make the total lifetime expense of the dual string WLED lighting device less than the lifetime expense of an original single phase WLED device that it replaces. This economic benefit would become even more pronounced if the dual string WLED lighting device had an efficiency improvement over the single phase device, which is likely due to temperature decrease of the WLEDs in the multiphase case.

The power reforming method in accordance with the present invention can also be applied to a color mixing device, which may turn at least two different color lamps of the color mixing device ON and OFF for a predetermined interval respectively.

The color lamps may be a CCFL, an EEFL, a CNL, a LED lamp or an OLED lamp.

The color of the individual color lamps may be red, green, blue or white light of different color temperatures. Color temperature is a way to describe the color spectrum of white light sources. A white light source with a high color temperature (5000 K) looks more blue and a light source with a lower color temperature (3000 K) looks more red.

The duty cycle of each differently colored lamp, that is a ratio of the interval of the lamp being turned ON to the total time, is varied for each differently colored lamp in order to achieve a desired mix of color. For example, white can be achieved by turning all three basic-color (RGB) lamps ON, purple can be achieved by turning the green color lamp OFF and turning the red color lamp and blue color lamps ON. Colors in between those absolutes can be achieved by modifying the relative duty cycles of the differently colored lamps.

The power reforming method for a color mixing device that is synchronized to the pulsating DC voltage is described. The frequencies of the at least two color lamps are all matched to the frequency of the pulsating DC voltage, which avoids flicker during color mixing.

Figure 5:
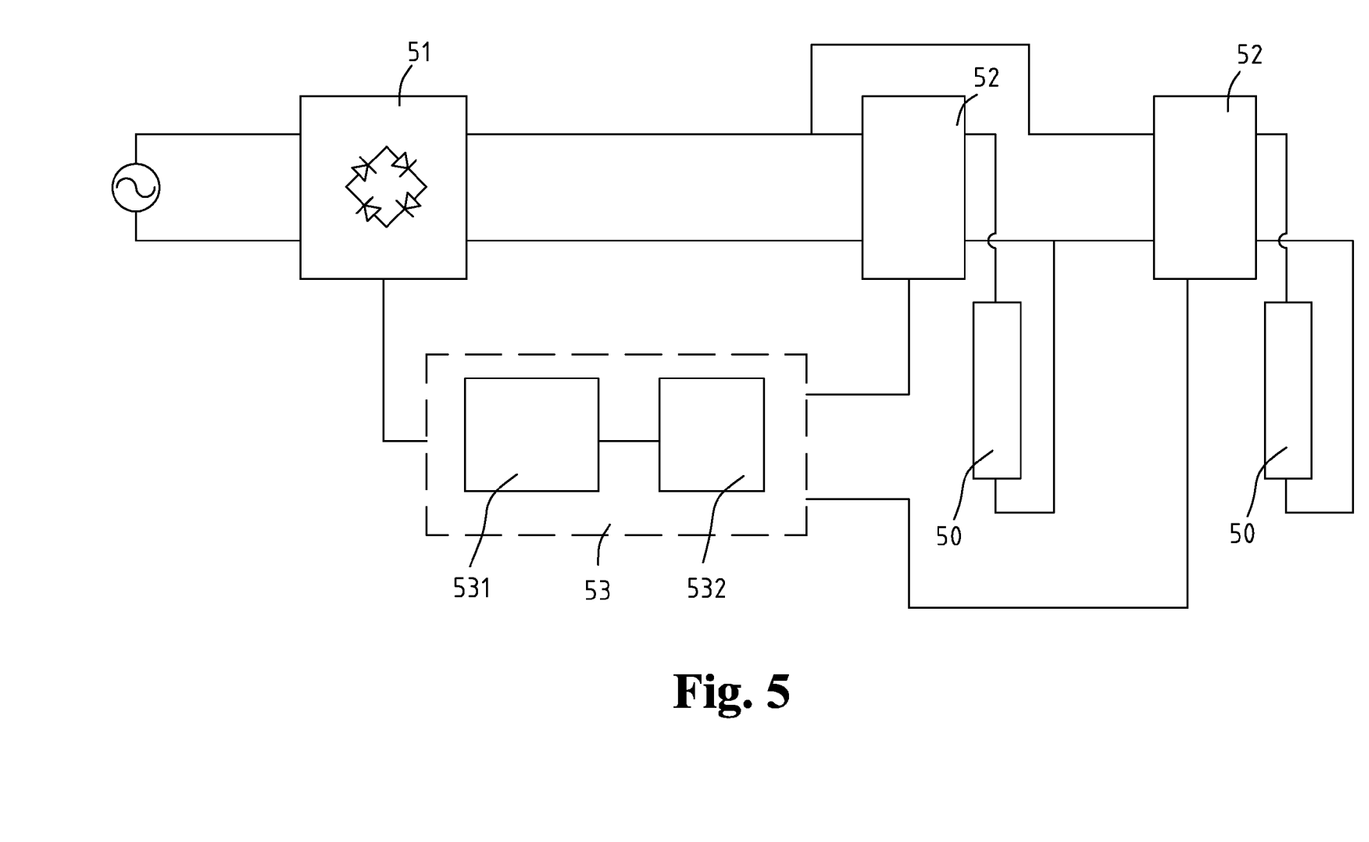
FIG. 5 is a circuit diagram of a multiphase light in accordance with the present invention.

With reference to FIG. 5, a multiphase light in accordance with the present invention comprises at least two lamps (50), a rectifier (51), at least two drivers (52) and a controller (53).

The lamp (50) may be a CCFL, an EEFL, a CNL, a LED lamp or an OLED lamp.

The rectifier (51) is connected to an external AC power source (i.e. a line voltage used in a residence), rectifies an AC voltage to a pulsating DC voltage and may be a full bridge rectifier. The full bridge rectifier may be implemented with four diodes.

Each driver (52) drives the corresponding lamp (50) and supplies current to the lamp (50). A person skilled in the art knows the driver (52) must be of a type that corresponds to the particular type of lamp (50). For example, a driver for an LED lamp can be a constant current device.

The controller (53) is connected between the rectifier (51) and the driver (52), and generates a pulse-width modulation (PWM) signal synchronized to the pulsating DC voltage, which turns the driver ON and OFF for at least one interval. The controller (53), in this embodiment, but not limited to, may be implemented with a phase locked loop (PLL) circuit (531) and a duty cycle selector (532).

The PWM signal has at least one ON time portion and at least one OFF time portion during one period of the pulsating DC voltage. The OFF time portion is commonly selected from a group consisting of 10% to 90% of duty cycle.

The PLL circuit (531) is connected to the rectifier (51), senses frequency and voltage of the pulsating DC voltage, divides the pulsating DC voltage into multiple time intervals and generates a clock signal that is phase locked to the pulsating DC voltage.

The duty cycle selector (532) is connected to the PLL circuit (531) and the drivers (52), receives the clock signal from the PLL circuit (531) and generates at least two PWM signals synchronized to the clock signal, which turns ON and turns OFF the drivers (52).

The duty cycles of PWM signals may be derived from logical combinations of multiples of the AC voltage frequency that are available from the PLL circuit (531). For example, if a PWM signal with 4 times (480 Hz) higher frequency than the pulsating DC voltage (120 Hz), the duty cycle selector (532) may easily produce duty cycles of 25%, 50%, 75% and (i.e. (120/480)×100%=25%).

In this way, the controller (53) may turn the driver ON and OFF with any desired timing.

The controller (53) may turn the drivers (52) all OFF at 0 and 180 degrees, turn the drivers (52) all ON at 90 and 270 degrees and turn the at least one driver (52) ON at other angular positions of a period of pulsating DC voltage, which shapes current to more accurately follow the waveform of the pulsating DC voltage thus improving the power factor.

The controller (53) may turn the drivers (52) ON and OFF respectively to lower the power and heat dissipation of each individual lamp (50) by the percentage of total OFF time.

A person skilled in art will realize that the PLL circuit (531) requires a finite amount of time to obtain a phase lock with its reference signal. In the present invention, the reference signal is the pulsating DC voltage. During the start up time, before phase lock, the output of the PLL circuit (531) is not synchronized to the pulsating DC voltage and the PLL circuit's output frequency may be higher or lower than the frequency necessary for proper operation. In this situation the PWM control signals that turn ON the various lamps in a multiphase light would most likely occur at inappropriate times.

This would in the very least cause a momentary reduction in power factor, an unwanted brightening or dimming, or an undesired color if the multiphase lamp were used for color mixing. In the worst case it may cause more serious current spikes on the supply lines at inappropriate times which may lead to reliability failures with extended usage.

Figure 9:
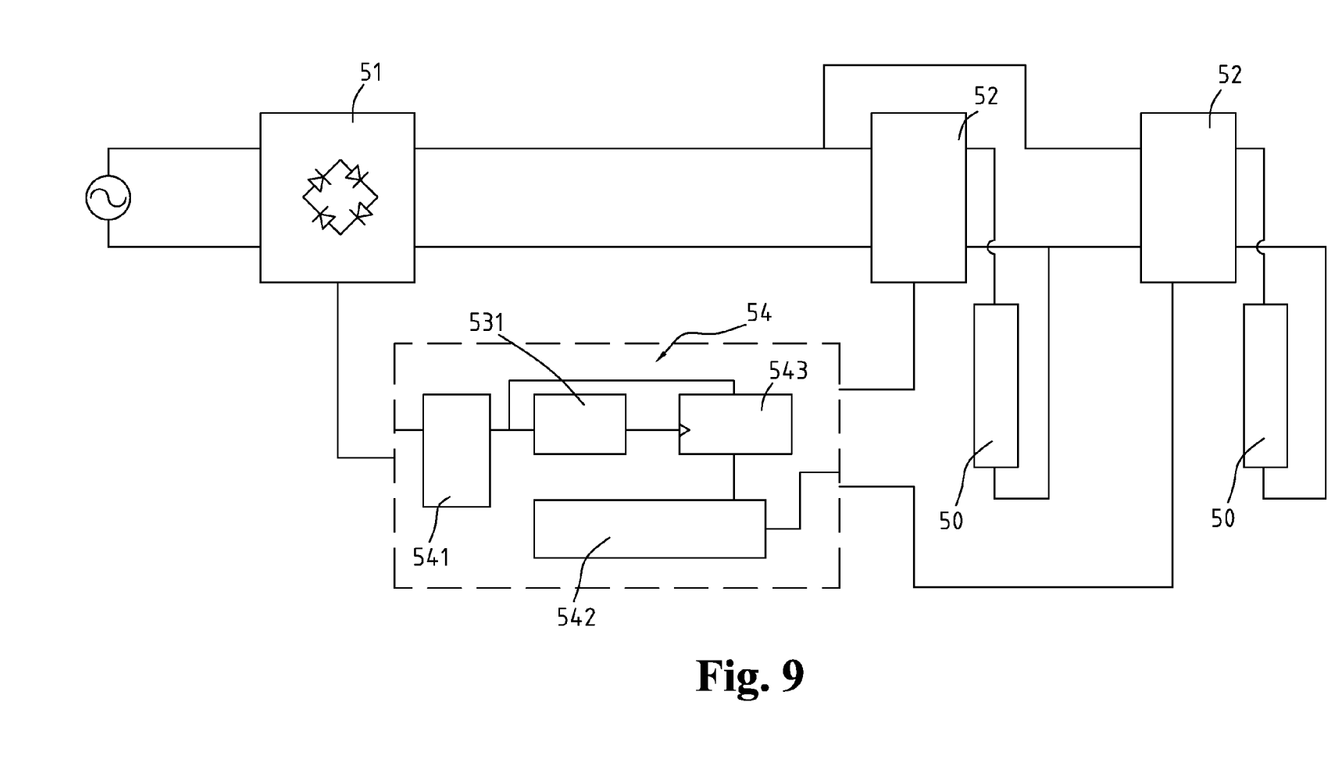
FIG. 9 is a circuit diagram of another embodiment with a controller of the multiphase light.

With reference to FIGS. 5 and 9, in order to avoid the start up problems just discussed the controller (53) can be improved by generating the at least two PWM signals based on a predetermined rule before the PLL circuit (531) has phase locked with the pulsating DC voltage. A modified controller (54), shows another embodiment of the controller (53), has replaced the duty cycle selector (532) and is connected to the PLL circuit (531). The modified controller (54) may comprise a voltage sensing unit (541), a memory unit (542) and a counter (543).

The voltage sensing unit (541) is connected to the rectifier (51) and the PLL circuit (531) and determines the 0 and 180 degree positions of the pulsating DC voltage as well as providing a reference clock for the PLL circuit (531).

The memory unit (542) may be a read-only memory, stores a look up table that has values that represent which lamp should be turned ON at the proper time and always turns all lamps OFF at 0 and 180 degrees of a period of the pulsating DC voltage.

The counter (543) is connected to the PLL circuit (531), the voltage sensing unit (541) and the memory unit (542). The counter (543) addresses the memory unit (542) to then generate the at least two PWM signals to the corresponding driver (52). The counter (543) is reset when the pulsating DC voltage reaches 0 and 180 degrees. Although the ON/OFF PWM control signals will not be totally accurate before the PLL circuit (531) establishes a phase lock they will at least be correct at 0 degrees and deviate from the ideal case as the pulsating DC waveform moves towards 180 degrees. At 180 degrees the counter (543) is reset again to the all OFF state, which is the desired situation for 180 degrees. For each succeeding cycle the PLL circuit (531) gets closer and closer to establishing a phase lock and consequently the error between the ideal PWM control signal and the actual PWM control signal becomes less and less. By resetting the counter at 0, 180, 360 . . . degrees the lamps will be turned OFF at the most important time and the invention will avoid the worst case situation of asking for full power when the pulsating DC waveform is near zero volts.

Figure 6:
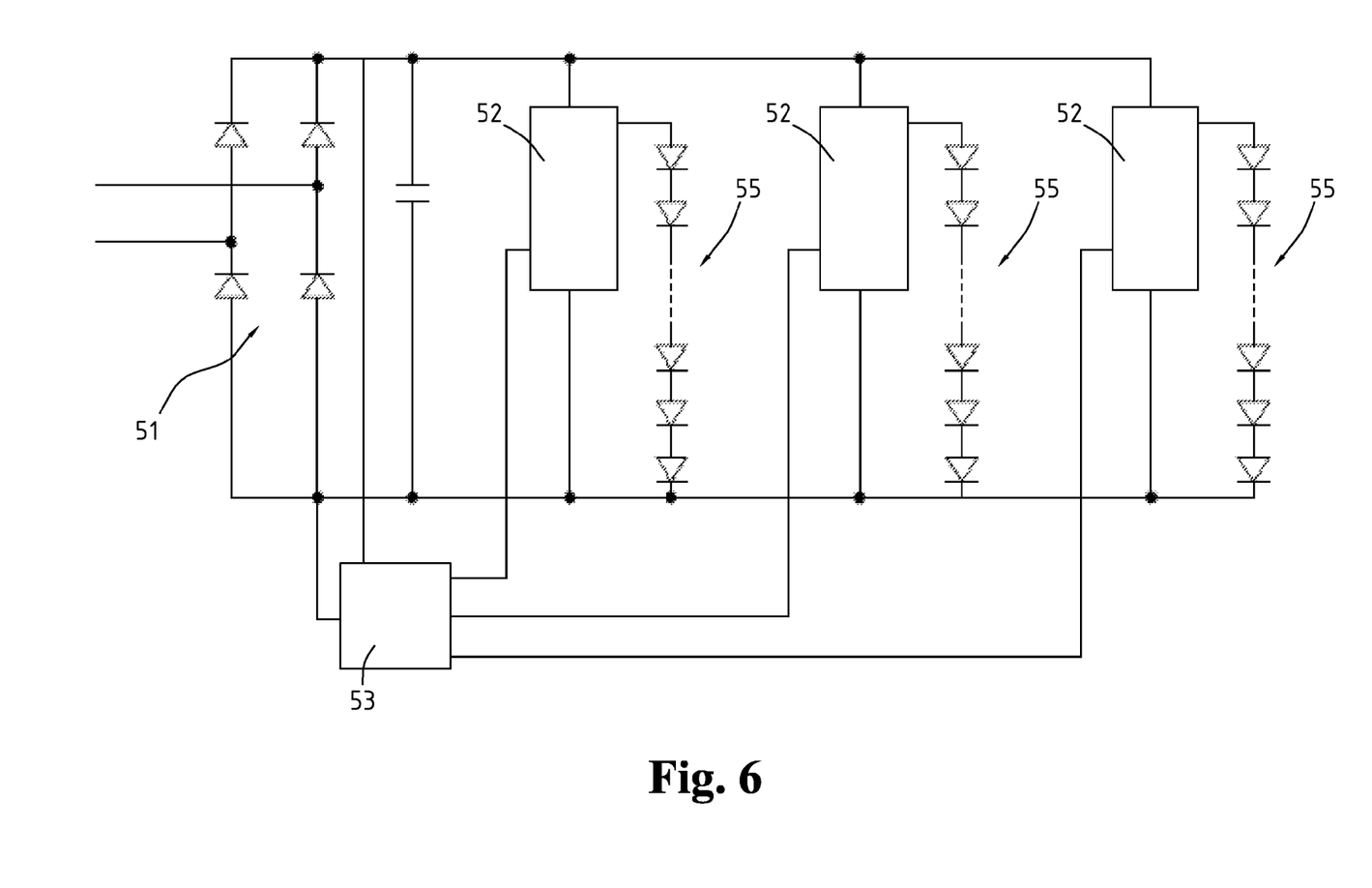
FIG. 6 is a circuit diagram of multiphase light with three white light emitting diode (WLED) strings.
Figure 7:
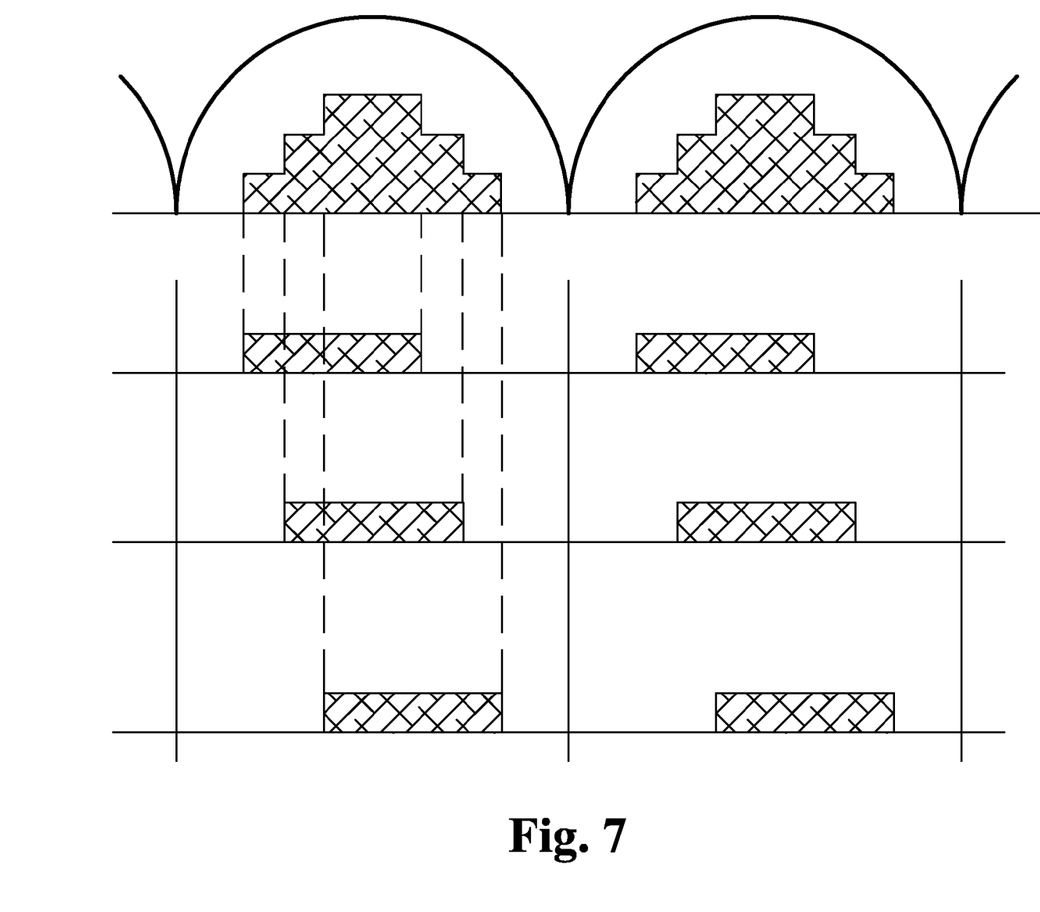
FIG. 7 is a wave diagram of current and voltage in FIG. 6.

With reference to FIGS. 6 and 7, an embodiment of a multiphase light of the present invention shows a situation using 3 interleaved WLED strings (55) with equal duty cycle that has improved power factor and better heat dissipation compared to single and dual phase schemes.

With reference to FIG. 5, the controller (53) may turn the drivers (52) ON and OFF for a predetermined interval respectively. Each lamp (50) may have different color or color temperature. The duty cycles of the lamps (50) are varied to achieve a desired color or color temperature.

The multiphase light further comprises an optional environmental sensor and an optional receiver.

The environmental sensor is connected to the controller (53) and senses local environmental information, which has a feedback loop to request the controller (53) to adjust duty cycle of each lamp (50) automatically. The local environmental information may be ambient light, sound or temperature.

The receiver is connected to the controller (53) and receives a wireless signal from an external control unit, which remotely controls the controller (53) to adjust duty cycle of each lamp (50). The wireless signal may be a radio frequency (RF) signal or an infrared (IR) signal.

Further, the at least two lamps (50) may be CCFLs in the form of interleaved helical shape and are mounted on a base. The base may be an Edison base connector that connects to a power source. The rectifier (51), the at least two drivers (52) and the controller (53) may be further integrated into an electronic module that is located in the base.

Figure 8:
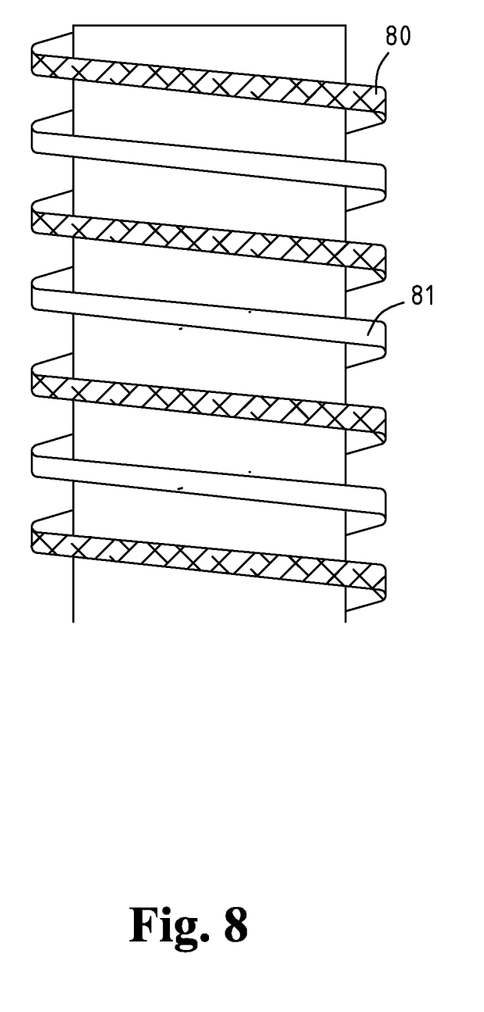
FIG. 8 is an embodiment of a multiphase light with two cold cathode fluorescent lamps in the form of an interleaved helical shape for color mixing.

With reference to FIG. 8, an embodiment of a multiphase light in accordance with the present invention comprises a first helical CCFL (80) and a second helical CCFL (81) interleaved in parallel. For example, if a color temperature of one of the interleaved CCFLs is 6000 K and a color temperature of the other interleaved CCFL is 3000 K then an approximate color temperature of 4500 K would be achieved when the ratio of the duty cycles of the two interleaved CCFLs was equal to one. Similar behavior could be obtained if the CCFLs were replaced by two different strings of WLEDs or other lighting technologies.

People skilled in the art will understand that various changes, modifications and alterations in form and details may be made without departing from the spirit and scope of the invention.

What is claimed is:

1. A power reforming method comprising acts of:
rectifying an AC voltage to a pulsating DC voltage;
synchronizing frequency and phase of an internal time base signal to the pulsating DC voltage;
setting pulse durations in a pulse period setting at least one rising time and at least one falling time of at least two control signals corresponding to the internal time base signal; and
turning at least two loads of an electronic device ON and OFF for at least one interval corresponding to the control signal, which shapes current flow to more accurately follow the pulsating DC voltage.

2. The power reforming method as claimed in claim 1, wherein the ON time portions are non-symmetrically distributed in a period of the pulsating DC voltage.

3. The power reforming method as claimed in claim 1, wherein the ON time portions are symmetrically distributed in a period of the pulsating DC voltage.

4. The power reforming method as claimed in claim 1, wherein the act of turning ON and OFF of an electronic device turns the loads all OFF at 0 and 180 degrees, all ON at 90 and 270 degrees and at least one load ON at other angular positions within a period of pulsating DC voltage.

5. The power reforming method as claimed in claim 1, wherein the loads are selected from a group consisting of a cold cathode fluorescent lamp (CCFL), an external electrode fluorescent lamp (EEFL), a carbon nanotube lamp (CNL), a light emitting diode (LED) lamp and an organic light emitting diode (OLED) lamp.

6. The power reforming method as claimed in claim 1, wherein one of the loads runs at a different power level from that of the other loads.

* * * * *